United States Patent
Liao

[19]

[11] Patent Number: 6,099,020
[45] Date of Patent: Aug. 8, 2000

[54] GOLF CLUB CART

[75] Inventor: Gordon Liao, Yung Kang, Taiwan

[73] Assignee: Unique Product & Design Co., Ltd., Tainan Hsien, Taiwan

[21] Appl. No.: 09/244,338

[22] Filed: Feb. 3, 1999

[51] Int. Cl.[7] ...................................................... B62B 3/02
[52] U.S. Cl. .................................. 280/643; 188/5; 280/30; 280/651; 280/62; 280/DIG. 6; 297/129; 297/217.1
[58] Field of Search ................................ 188/5; 297/118, 297/129, 188.01, 217.1; 280/30, 642, 643, 646, 648, 651, 47.25, 62, DIG. 6

[56] References Cited

U.S. PATENT DOCUMENTS

| | | | |
|---|---|---|---|
| 2,599,928 | 6/1952 | Lyons | 280/47.25 X |
| 2,673,589 | 3/1954 | Kunkel | 280/DIG. 6 |
| 2,777,707 | 1/1957 | Cloes | 280/DIG. 6 |
| 4,749,228 | 6/1988 | Potter | 297/217.1 |
| 4,756,539 | 7/1988 | Sneddon | 280/47.25 X |
| 4,988,117 | 1/1991 | Shortall | 280/646 |
| 5,374,073 | 12/1994 | Hung-Hsin | 280/47.25 X |
| 5,582,419 | 12/1996 | Lucia et al. | 280/DIG. 6 |
| 5,836,601 | 11/1998 | Nelson | 280/47.25 X |

*Primary Examiner*—Michael Mar
*Attorney, Agent, or Firm*—Pro-Techtor International Services

[57] ABSTRACT

A golf club cart includes two rear wheels, an axle combined with the rear wheels, a horizontal U-shaped frame combined with the axle at a rear end and with a bottom rod at a front end, an inverted U-shaped rod pivotally connected with the frame at a lower end and with a handle and a support rod at an upper end, a third wheel provided under a front end of the frame, and a shock-absorbing device consisting of a torque provided between the frame and the shaft of the third wheel. Then the third wheel is pressed by the torque spring to stand on the ground, with the frame raised up a little and let the bottom rod not touching the ground. The torque spring can absorb or reduce bumping and vibration caused by bumping grounds when the golf club cart is pushed along. Thus, the golf club cart has a simple structure, saving manual force and convenient to handle.

5 Claims, 7 Drawing Sheets

GOLF CLUB CART

BACKGROUND OF THE INVENTION

This invention relates to a golf club cart, particularly to one provided with a simple structure with a shock-absorbing function, convenient to carry, and saving manual force in carrying.

A conventional golf club cart generally has two wheels, with a handle Pressed down with force in pulling forward the cart to let a lower bracket to rise up a little. So it rather need considerable manual force to pull along, not so convenient. And some makers add a small third wheel under the lower bracket to support the golf club cart to save manual force in pushing in order to make it convenient to handle. However, if the ground of a golf link is not flat but bumpy, even a golf club cart with the third wheel may not be able to move along with stability, swaying around in movement. So a user still has to grip the handle tightly to keep the golf club cart roll along, with manual force not saved.

SUMMARY OF THE INVENTION

The main purpose of the invention is to offer a golf club cart having a simple structure with a shock-absorbing device for a user to need only a little force for pushing the golf club cart forward.

BRIEF DESCRIPTION OF DRAWINGS

This invention will be better understood by referring to the accompanying drawings, wherein.

DETAILED DESCRIPTION OF THE PREFERRED EMBODIMENTS

Figure 1:
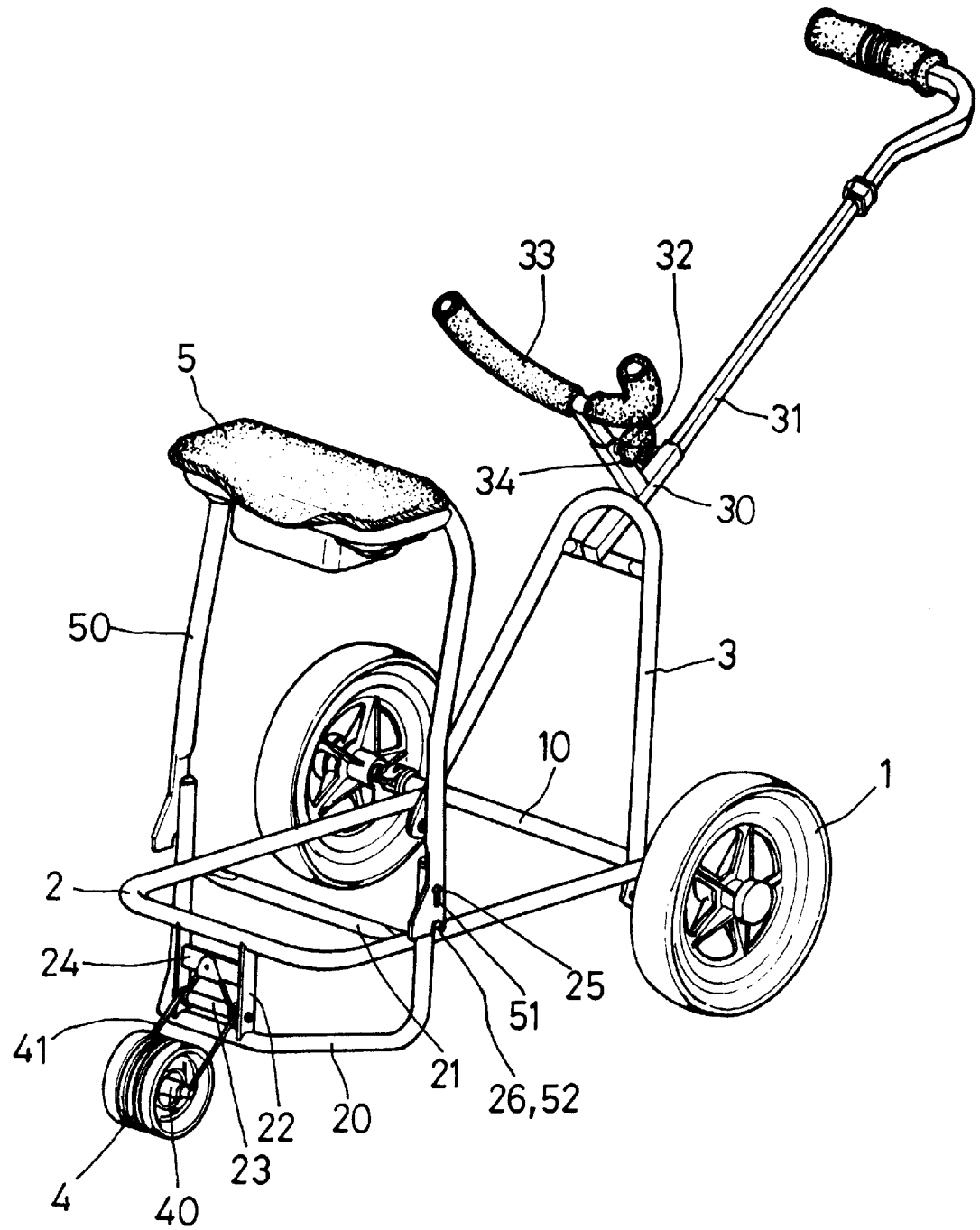
FIG. 1 is a perspective view of a golf club cart in the present invention.

A first preferred embodiment of a golf club cart in the present invention, as shown in FIG. 1, includes two rear wheels 1 combined with an axle 10, a horizontal U-shaped frame 2 fixed with the axle 10 at two rear ends, a lateral rod 21 fixed with the frame 2, a U-shaped rod 20 fixed with the frame 2 and extending down to form a lower bracket and having a bottom portion extending forward and its front end bent up a little, two parallel strips 22 fixed between the frame 2 and the front end of the bottom rod 20, a rod 23 and a flat plate 24 fixed between the two parallel strips 22, and two projecting studs 25, 26 provided spaced apart respectively on two upper ends of the two vertical portions of the bottom rod 20.

The golf club cart further includes an inverted U-shaped rod 3 having two lower ends pivotally connected to the two rear ends of the frame 2, a T-shaped sleeve 30 fixed with the rod 3 at the upper end, a handle 31 fitted movably in the T-shaped sleeve 30, a first rotatable button 32 screwed with the T-shaped sleeve 30 for securing the handle 31, and a second rotatable button 34 screwed with the T-shaped sleeve 30 for securing a curved support rod 33 fitting in the T-shaped sleeve 30.

Further the golf club cart has a third small wheel 4 as a front wheel, provided under the front end of the frame 2, with a shock-absorbing device located between the axle 40 of the wheel 4 and the frame 2, consisting of a torque spring 41 having two ends fixed with two sides of the axle 40, and fitting around the rod 23 and a projection on the flat plate 24 so that the third wheel 4 may be always compressed down, and the frame may be biased upward, with the bottom rod 20 not touching the ground.

Further, a seat 5 is provided on the golf club cart, supported on an inverted U-shaped leg rod 50 having two lower ends provided respectively with a slot 51 and a notch 52 for the projecting studs 25, 26 to fit with for securing leg rod 50 with the bottom rod 20.

Figure 2:
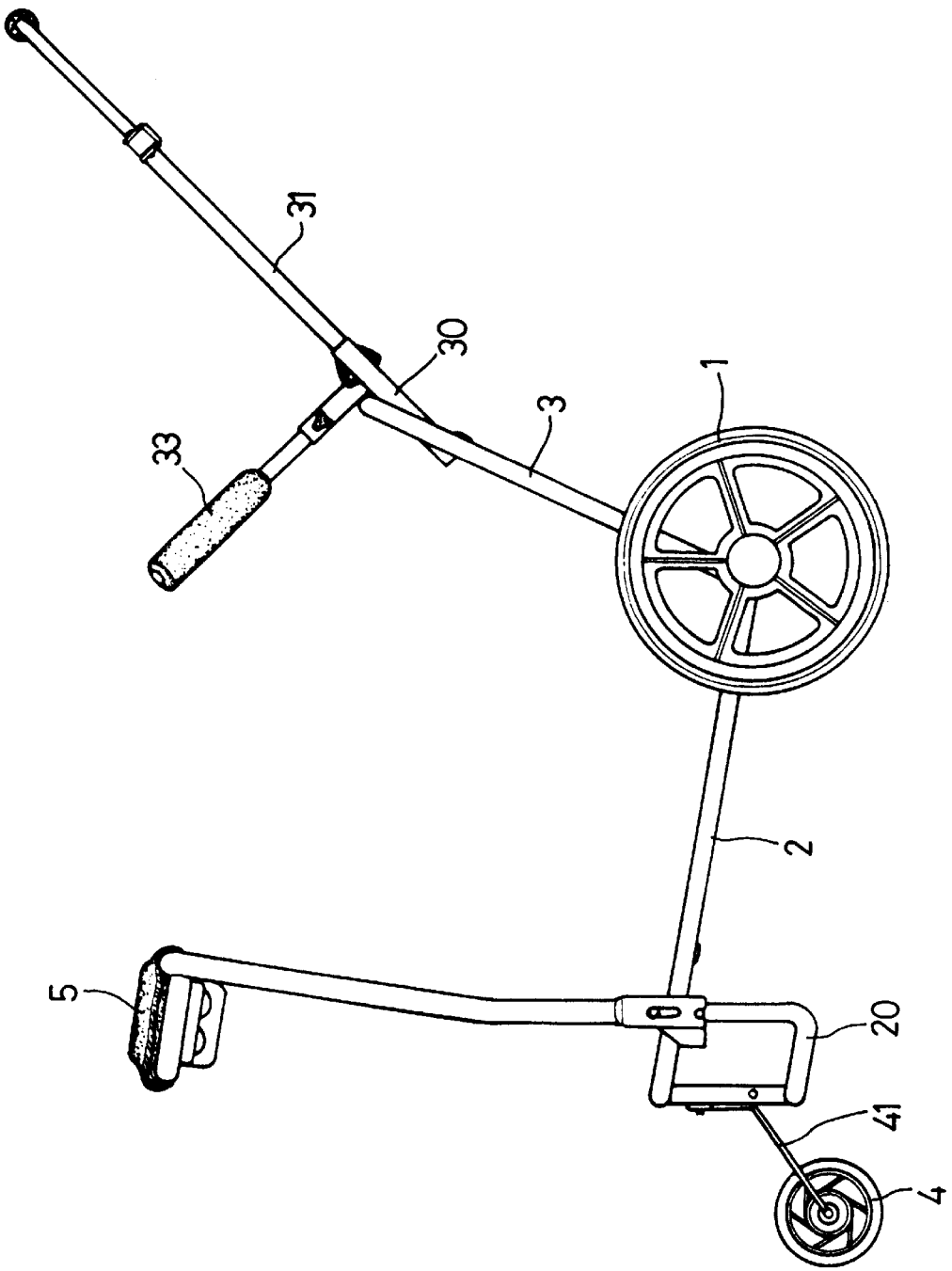
FIG. 2 is a side view of the golf club cart in the present invention.
Figure 3:
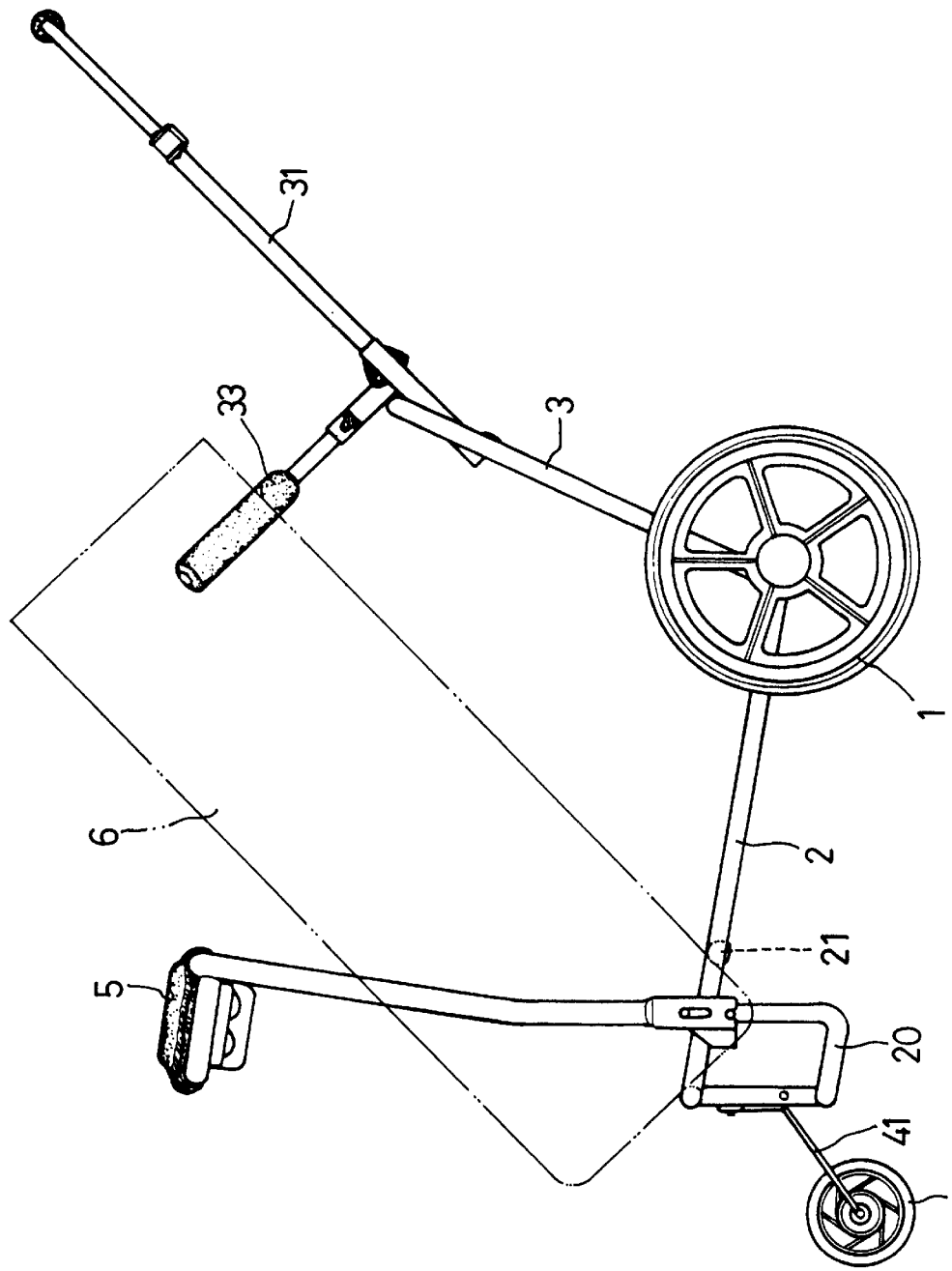
FIG. 3 is a side view of the golf club cart carrying a club bag thereon in the present invention.

The assembled golf club cart is shown in FIG. 2 with the two rear wheels 1 and the third wheel 4 standing on the ground, supported with three points. And the frame 2 is a little inclining backward and bent up a little, with the bottom rod 20 not touching the ground. When a golf club bag 6 is laid on the cart as shown in FIG. 3, it can be supported by the elasticity of the torque spring 41, as a golf club bag generally weighs less than 20 kgs., and the frame 2 and the bottom rod 20 may not sag, or sag only a little, with the bottom rod 20 never touching the ground. Then a user may easily push forward the golf club cart with the club bag 6 together, with the torque spring elastically functioning to absorb or reduce bumping and vibration caused by the ground, saving manual force in handling the golf club cart.

Figure 4:
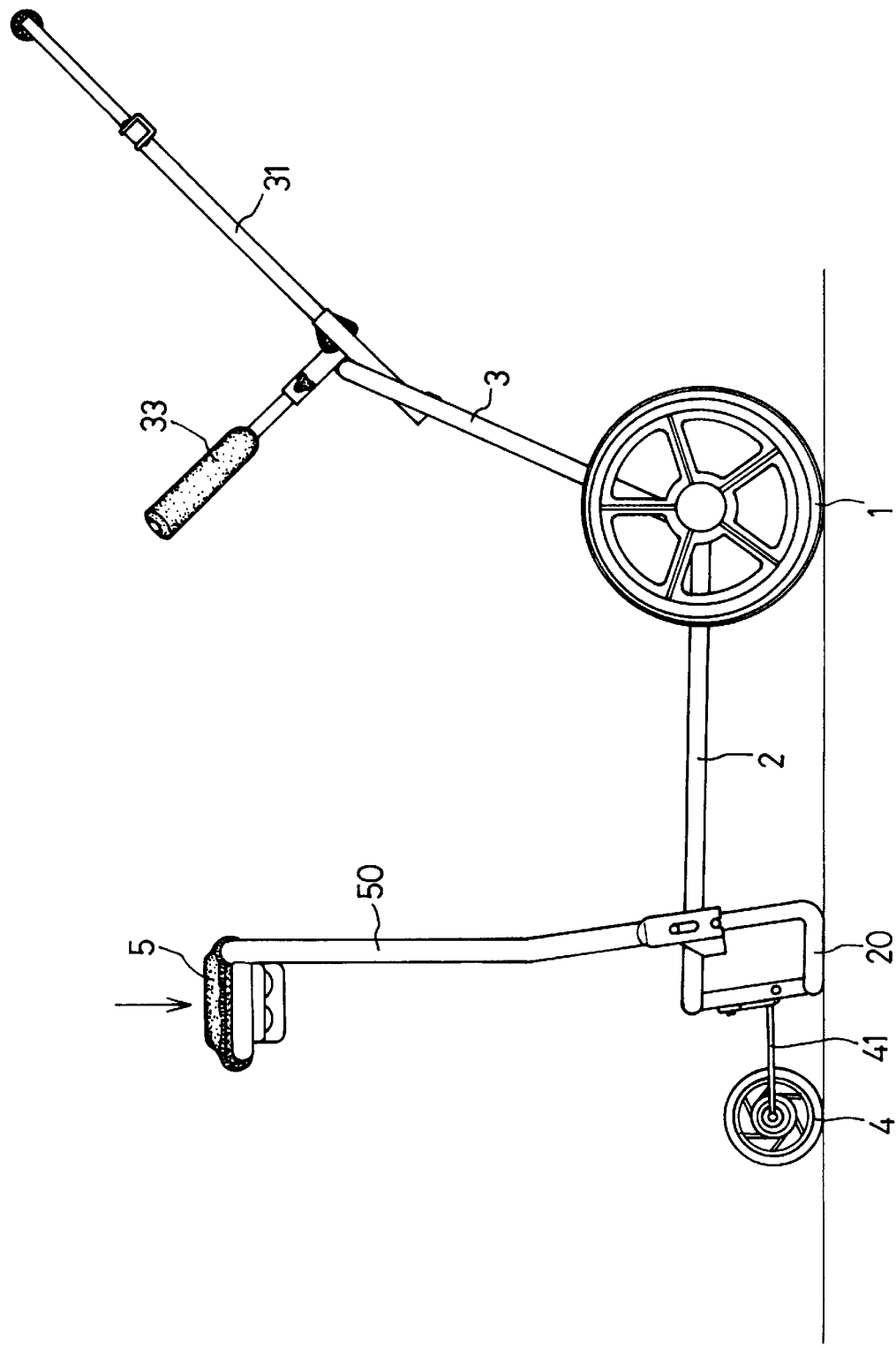
FIG. 4 is a side view of the golf club cart with its seat being used in the present invention.

In case that a user wants to rest a while, he/she can sit on the seat 5, with the bottom rod 20 pressed by sitter's weight to sag and rest on the ground, as shown in FIG. 4.

Figure 5:
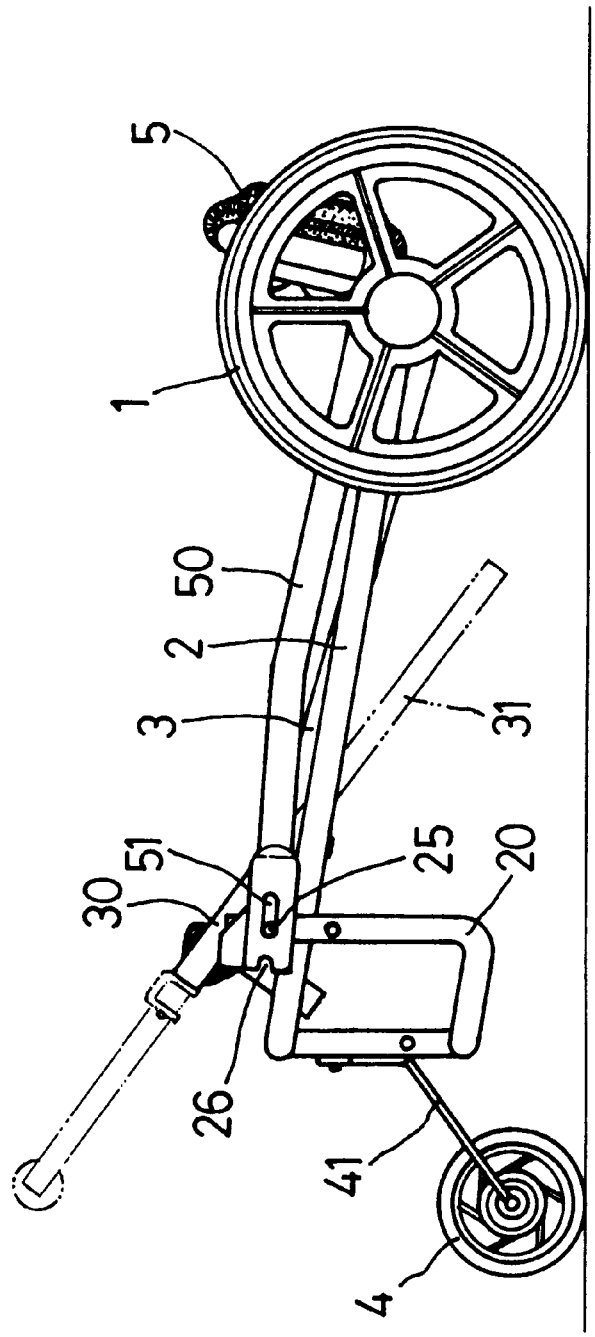
FIG. 5 is a side view of the golf club cart collapsed in the present invention.

In order to make the golf club cart collapsible, the handle 31 and the support rod 33 are combined with the inverted U-shaped rod 3 by means of the T-shaped sleeve 30 inserting in the sleeve 30, and the seat 5 with the inverted U-shaped leg rod 50 is releasably fitted with the bottom rod 20. If the golf club cart is to be collapsed, the rotatable buttons 32 and 34 are screwed off the T-shaped sleeve 30, taking off the handle 31 and the support rod 33 from the T-shaped sleeve 30. Then the inverted U-shaped rod 3 is folded rearward on the frame 2, and the seat 5 together with the support leg rod 50 is pulled up, with the notches 52 separating from the studs 26 of the support leg rod 50, and then holded forward to lie on the inverted U-shaped rod 3, with the handle 31 swung down into the inverted U-shaped rod 3, as shown in FIG. 5, finishing collapsing the golf club cart. The small third wheel 4 can also be taken off and properly placed on the golf club cart, as the support rod 33 is, (not shown in Figures). Then collapsed golf club cart is convenient for carrying, packaging and transporting.

Figure 6:
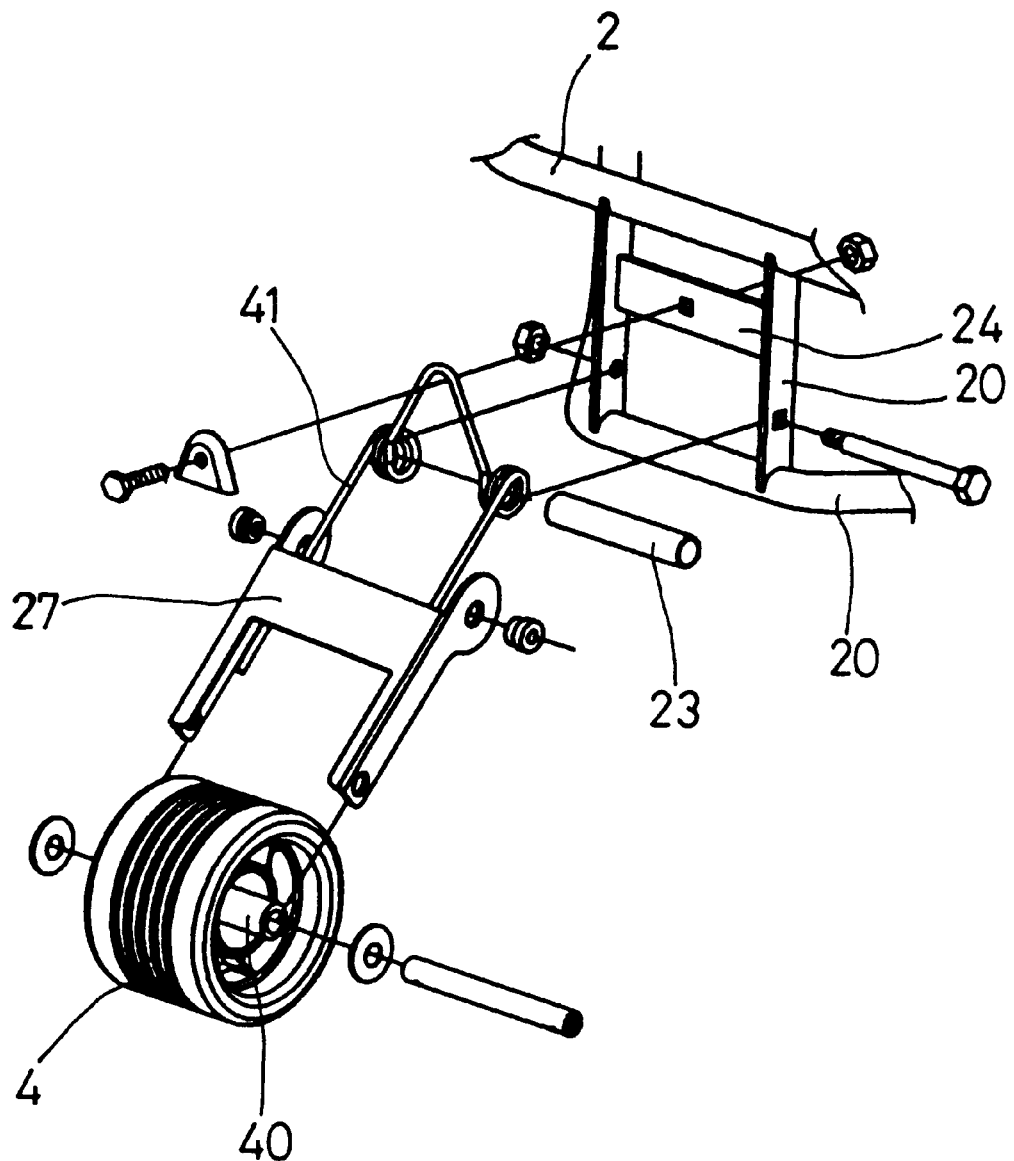
FIG. 6 is a partial exploded perspective view of a second preferred embodiment of a golf club cart in the present invention; and, FIG. 7 is a perspective view of the second preferred embodiment of a golf club cart in the present invention.
Figure 7:
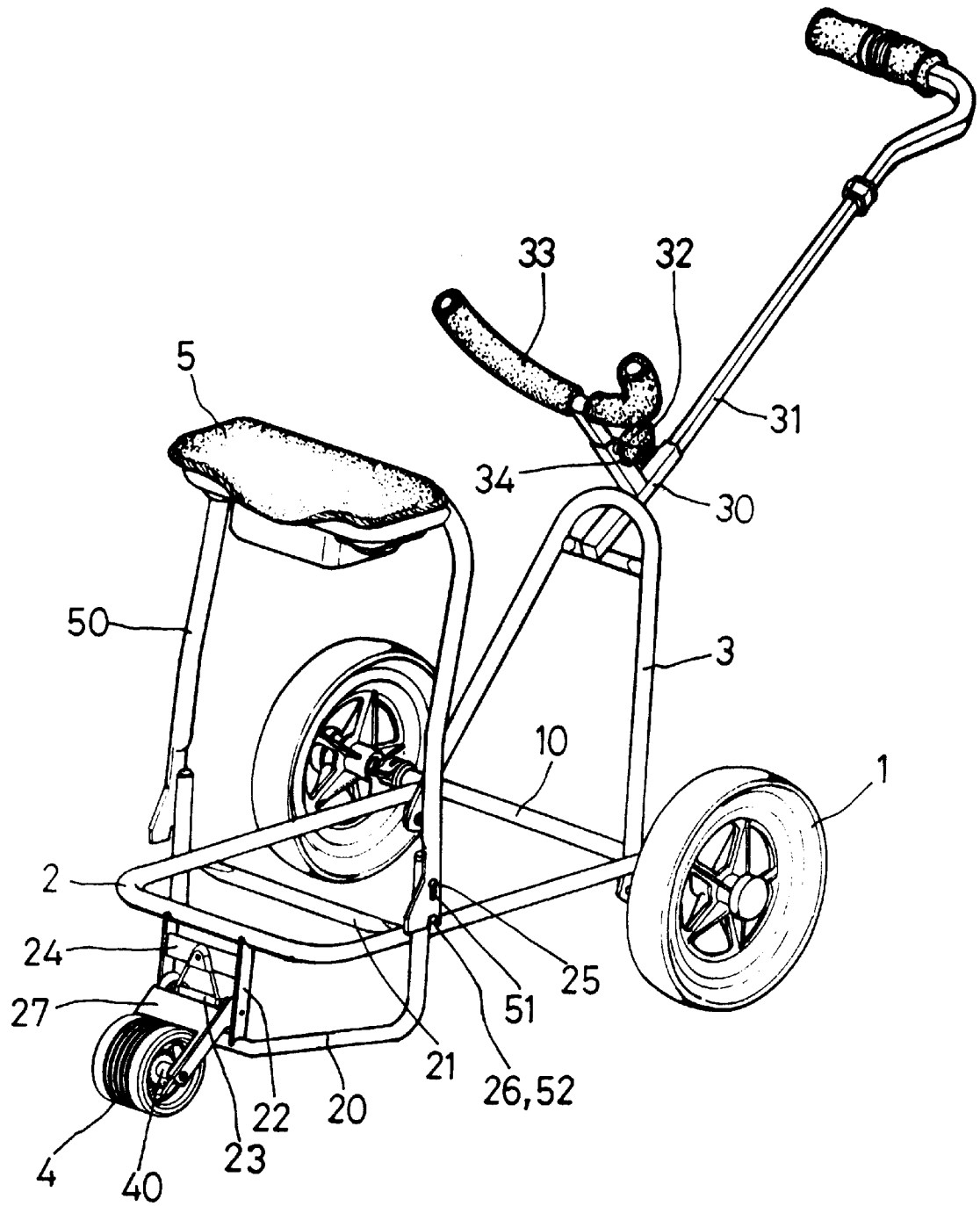

A second preferred embodiment of a golf club cart is shown in FIGS. 6 and 7, has the same structure as the first preferred embodiment, except an inverted U-shaped plate 27 Provided between the shock-absorbing device and the bottom rod 20. The plate 27 has two upper ends fixed with the rod 23 and located between the two strips 22, and having two lower ends combined with the axle 40. Thus, the plate 27 is located on the torque spring 41, increasing rigidity and having the same function as the first preferred embodiment.

The invention has the following advantages, as can be understood from the aforesaid description.

1. The structure is simple, including two wheels, a bottom rod and the frame with the lower bracket, the T-shaped sleeve for releasably combining the handle and the support rod, and the small third wheel supported with the torque spring.

2. It has a seat for resting.

3. The torque spring can absorb or reduce bumping and vibration caused by bumpy grounds in pushing it along, obviously saving manual force and convenient in handling.

4. The handle and the support rod are releasable combined with the T-shaped sleeve, which is fixed with the inverted U-shaped rod pivotally connected with the frame, and the seat is fixed on the support leg rod pivotally connected with the frame so that the golf club cart may be assembled and collapsed easily.

While the preferred embodiments of the invention have been described above, it will be recognized and understood that various modifications may be made therein and the appended claims are intended to cover all the modifications which may fall within the spirit and scope of the invention.

I claim:

1. A golf club cart, comprising;
   a horizontal U-shaped frame having a front portion and two rear ends;
   an axle attached to the two rear ends of the U-shaped frame;
   a pair of rear wheels connected to opposite ends of the axle;
   an inverted U-shaped rod having two lower ends and an upper end portion, the two lower ends being pivotally connected to the U-shaped frame;
   a bottom rod having a bottom portion and two upper end portions fixedly attached to the front portion of the U-shaped frame;
   a handle attached to the upper end portion of the U-shaped rod;
   a curved support rod connected to the handle;
   a front wheel assembly including a mounting bracket connected between the U-shaped frame and the bottom rod, a spring attached to the mounting bracket, and a front wheel rotatably attached to a lower end of the spring, the spring exerting a biasing force against the wheel for maintaining the bottom portion of the bottom rod in a raised position above a ground surface; and
   a seat pivotally attached to the two upper end portions of the bottom rod, wherein the bottom portion of the bottom rod is adapted to be positioned in a first operative position above the ground surface for permitting rolling movement of the front wheel when the cart is only used for transporting a golf bag supported thereon, and the bottom portion of the bottom rod is adapted to be positioned in a second position in engagement with the ground surface for preventing rolling movement of the front wheel, when a downward force sufficient to over the biasing force of the spring is exerted upon the seat by a user seated thereon.

2. The golf club cart as claimed in claim 1, wherein the bottom portion of said bottom rod is formed by a forwardly and upwardly extending portion.

3. The golf club cart as claimed in claim 1, wherein the mounting bracket includes two parallel strips provided between said bottom portion of said bottom rod and the front end of said U-shaped frame, and a rod and a plate are affixed between said two strips for attaching said torque spring of said shock-absorbing device.

4. The golf club cart as claimed in claim 1, wherein an inverted U-shaped plate is provided between said bottom rod and said front wheel.

5. The golf club cart as claimed in claim 1, wherein said bottom rod has two projecting studs properly spaced apart respectively on two upper ends, and an inverted U-shaped support leg rod for supporting the seat has two lower ends respectively provided with a slot and a notch for said two studs of said bottom rod to fit with so as to enable said support leg rod to pivot by means of said studs and said slots.

* * * * *